United States Patent [19]

Hori et al.

[11] Patent Number: 4,946,401

[45] Date of Patent: Aug. 7, 1990

[54] CONNECTING BLOCK FOR TELEPHONE

[75] Inventors: Akira Hori; Minoru Noda; Shigenobu Ohara; Yuzo Mochizuki; Junji Nomura, all of Inazawa, Japan

[73] Assignee: Tomei Thushin Kogyo Co., Ltd., Inazawa, Japan

[21] Appl. No.: 437,610

[22] Filed: Nov. 17, 1989

[51] Int. Cl.⁵ .......................................... H01R 27/00
[52] U.S. Cl. .................................. 439/224; 439/133; 439/367; 439/676; 439/217
[58] Field of Search ............... 439/133, 134, 217, 224, 439/221, 366, 367, 374, 377, 668, 676, 910

[56] References Cited

U.S. PATENT DOCUMENTS

| | | | |
|---|---|---|---|
| 3,345,600 | 10/1967 | Scherer | 439/134 |
| 3,416,123 | 12/1968 | Husebo | 439/134 |
| 4,103,985 | 8/1978 | Krolak et al. | 439/367 |
| 4,220,391 | 9/1980 | Krolak et al. | 439/676 |
| 4,221,458 | 9/1980 | Hughes et al. | 439/676 |
| 4,497,526 | 2/1985 | Myers | 439/81 |
| 4,671,600 | 6/1987 | Sawai et al. | 439/224 |
| 4,806,117 | 2/1989 | Johnston | 439/676 |
| 4,820,192 | 4/1989 | Denkmann et al. | 439/676 |
| 4,875,872 | 10/1989 | Tanaka | 439/83 |

*Primary Examiner*—Paula A. Bradley
*Attorney, Agent, or Firm*—Paul L. Sjoquist

[57] ABSTRACT

A connecting block for electrically connecting a plug of a telephone set to a telephone line includes a base plate having a terminal for connection to the telephone line, a jack unit including a jack having an opening for inserting the plug thereinto, the jack unit having parallel side walls across the jack opening, a pair of parallel retaining members extending upwardly from side edges of the base plate for removably retaining the jack unit therebetween, and a cover for enclosing the retaining members, the jack unit and the terminal, the cover having a window to which the jack opening may be exposed. The arrangement of the jack unit and the retaining members is such that the jack opening may selectively extend parallel to the base plate or perpendicular thereto.

3 Claims, 2 Drawing Sheets

4,946,401

CONNECTING BLOCK FOR TELEPHONE

BACKGROUND OF THE INVENTION

1. Field of the Invention

The present invention relates to a connecting block for connecting a telephone set to a telephone line.

2. Description of the Prior Art

Conventionally, a connecting block for telephone includes a jack into which a plug provided at the end of a cord of a telephone set is inserted and includes a box-like housing for enclosing the jack. In many designs, the jack has an opening exposed through a window formed in the upper surface of the housing. The housing is secured to or embedded in a wall or other fixed member of a building.

However, in the above conventional connecting block, such a jack is fixed in the housing which has the window opening only in one direction, so that, in some mounting positions, the space left above the upper surface of the housing may be too small to permit insertion of a plug therein.

In such a case, another connecting block is required which has a jack opening located on a side of the housing. Therefore, in installation work, two types of connecting blocks must be prepared, and if the direction of insertion of the plug is to be changed after installation of a connecting block, the connecting block must be replaced by another one. This may lead to increased costs and labor.

SUMMARY OF THE INVENTION

It is, accordingly, an object of the present invention to provide an improved construction of connecting block which avoids the difficulties associated with the known connecting blocks.

According to the present invention, there is provided a connecting block for electrically connecting a plug of a telephone set to a telephone line. The connecting block comprises a base plate having a terminal for connection to the telephone line, a jack unit including a jack having an opening for inserting the plug thereinto, the jack unit having parallel side walls across the jack opening, a pair of parallel retaining members extending upwardly from side edges of the base plate for removably retaining the jack unit therebetween, and a cover for enclosing the retaining members, the jack unit and the terminal, the cover having a window to which the jack opening may be exposed. The arrangement of the jack unit and the retaining members is such that the jack opening may selectively extend parallel to the base plate or perpendicular thereto.

In the connecting block of the present invention as described above, selection of orientation of the jack to be fitted in the retaining members makes the opening of the jack to be exposed to the corresponding one of the two directions. Thus, the limit to the mounting position of the connecting block associated with the prior art can be eliminated, and even after installation, the opening direction of the jack can be freely changed, so that when it is desired to change the direction of insertion of the plug, there is no need for specific work to be done by engineers.

The invention will become more fully apparent from the claims and the description as it proceeds in connection with the drawings.

DETAILED DESCRIPTION OF THE PREFERRED EMBODIMENT

Figure 1:
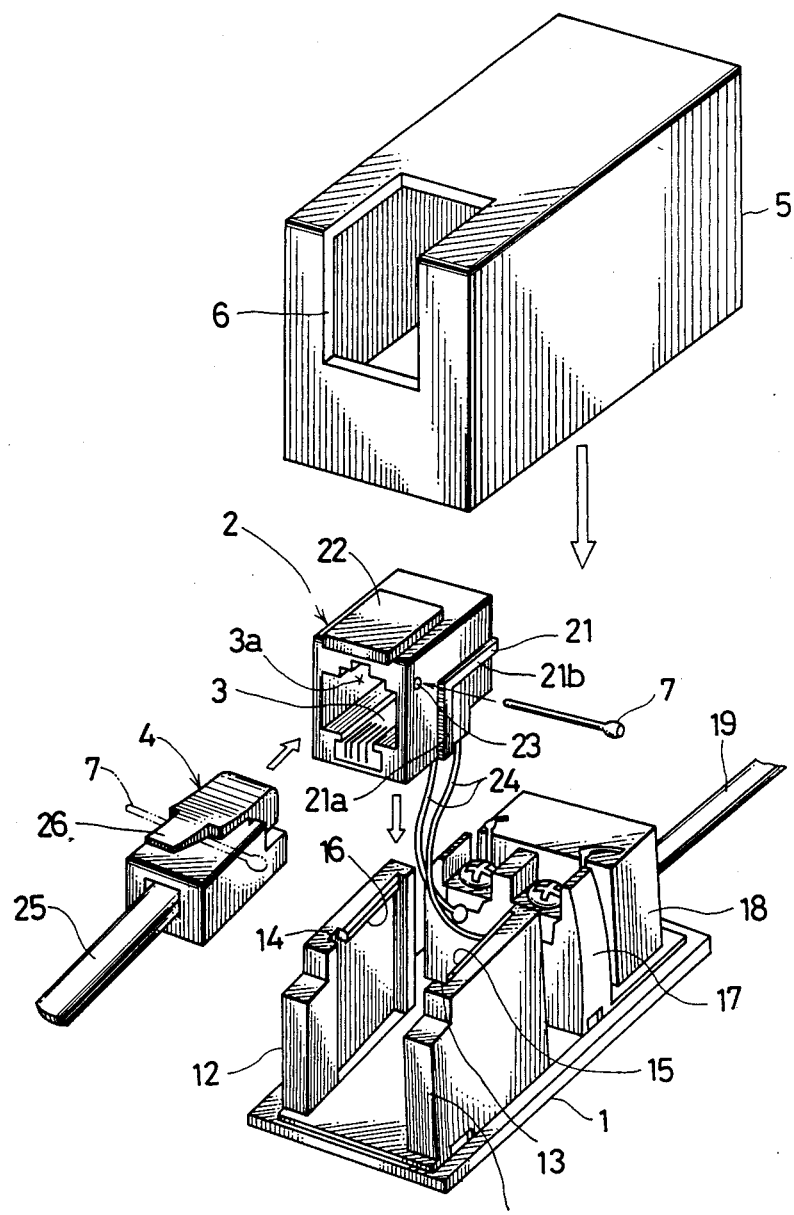
FIG. 1 is an exploded perspective view of a connecting block according to the present invention.

Referring to FIG. 1, there is shown a connecting block in exploded perspective view to illustrate the invention described herein. As shown therein, the connecting block includes a rectangular base plate 1, a jack unit 2 and a cover 5.

The base plate 1 includes a pair of retaining members 11 and 12 extending vertically from both sides of the base plate 1 adjacent the front end thereof. The retaining members 11 and 12 are so constructed as to receive the jack unit 2 therebetween to hold it tightly. To this end, the retaining members 11 and 12 have slits 13 and 14 formed on the upper surfaces thereof and engaging projections 15 and 16 extending along the uppermost inner edges thereof. A terminal 17 is provided behind the retaining members 11 and 12 to which a telephone line cord 19 is connected. Behind the terminal 17 is disposed a capacitor 18 connected to the terminal 17.

The jack unit 2 is of a generally box-like configuration and includes a jack 3 into which a plug 4 attached to the end of a telephone cord 25 can be inserted. The jack 3 has a longitudinally extending opening 3a exposed to one end of the jack unit 2. The jack unit 2 also includes a pair of right-angulated guide members 21 (only one of which is seen in FIG. 1) formed on both sides thereof and adapted to be inserted into the slits 13 and 14 of the retaining members 11 and 12 so as to guide the jack unit 2 into a predetermined position between the retaining members 11 and 12. To this end, each of the guide members 21 has a first portion 21a extending perpendicular to the opening 3a of the jack 3 and a second portion 21b extending parallel to the opening 3a of the jack 3. Thus, to position the jack unit 2 between the retaining members 11 and 12, the first portions 21a of the guide members 21 are inserted into the slits 13 and 14, and at the same time, the second portions 21b are brought into engagement with the engaging projections 15 and 16 so as to prevent the jack unit 2 from slipping off.

It will be noted that the jack unit 2 can be selectively fitted in two positions between the retaining members 11 and 12 by changing the inserting direction of the guide members 21; one is the position as shown in FIG. 1 in which the opening 3a of the jack 3 extends parallel to the base plate 1, and the other is the position in which the opening 3a of the jack 3 extends perpendicular to the base plate 1.

The jack unit 2 further includes a closure member 22 formed on the upper surface thereof and a pair of holes 23 (only one of which is seen in FIG. 1) formed in both sides thereof adjacent the guide members 21. The task of these elements will be described later. Connecting cords 24 extending from the jack 3 are connected to the terminal 17.

The cover 5 is in the form of a box which encases the retaining members 11 and 12, the jack unit 2, the terminal 17 and the capacitor 18. The cover 5 has a continuous window 6 formed in the front surface and the upper surface of the cover 5 in such a manner as to allow the opening 3a of the jack 3 to be exposed outside and fit the closure member 22 of the jack unit 2 therein.

In the preferred embodiment, when the plug 4 is inserted into the jack 3, a pin 7 may be inserted through the holes 23 across the opening 3a of the jack 3, as shown in solid lines in FIG. 1, so that the pin 7 may extend below a lock piece 26 of the plug 4, as shown in broken lines in FIG. 1, to prevent the plug 4 from slipping off. When the cover 5 is put over the jack unit 2, the pin 7 is concealed within the cover 5, so that it will not be pulled off by an unauthorized person. This effectively prevents tampering with the plug 4, and especially for telephone sets provided in hotels and inns, such a structure for preventing pulling out of the plug 4 by the pin 7 is quite advantageous.

The function of the improved connecting block will now be described with reference to FIGS. 2 and 3.

Figure 2:
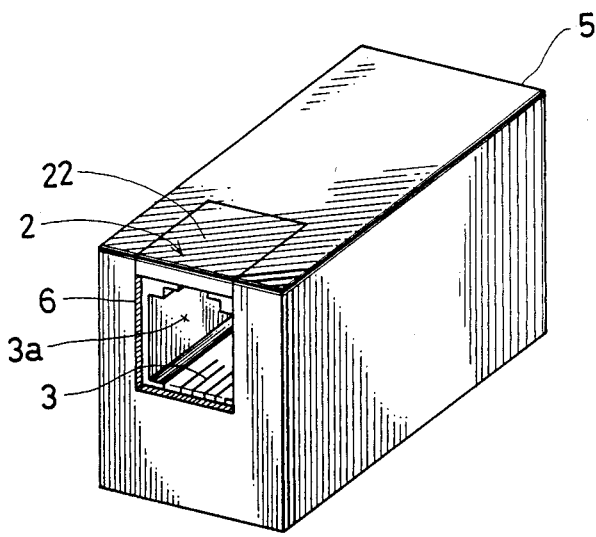
FIG. 2 is a perspective view of the connecting block in an assembled condition.

When the cover 5 is put over the jack 3 which is, for example, in the position as shown in FIG. 1, the opening 3a of the jack 3 is exposed outside through the front portion of the window 6 as shown in FIG. 2, while the upper portion of the window 6 is closed by the closure member 22, the outer surface of the closure member 22 being flush with the upper surface of the cover 5.

Figure 3:
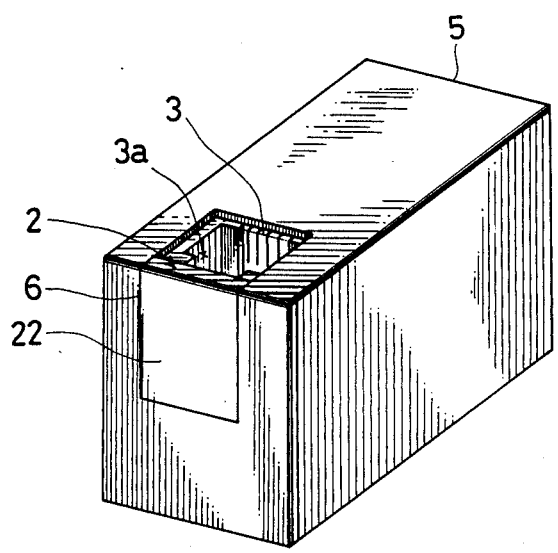
FIG. 3 is a perspective view of the connecting block in another assembled condition.

On the other hand, when the jack unit 2 is fitted between the retaining members 11 and 12 with the opening 3a of the jack 3 exposed upwardly and the cover 5 is put over the jack unit 2, the opening 3a of the jack 3 is exposed outside through the upper portion of the window 6 as shown in FIG. 3, while the front portion of the window 6 is closed by the closure member 22, the outer surface of the closure member 22 being flush with the end surface of the cover 5.

In this way, the plug 4 can be selectively inserted from the upper side or the front side of the cover 5 by changing the orientation of the jack unit 2 to be fitted between the retaining members 11 and 12.

From the foregoing description of the connecting block, it can be appreciated that selection of orientation of the jack to be fitted between the retaining members makes the opening of the jack to be exposed to the corresponding one of the two directions. With this arrangement, the limit to the mounting position of the connecting block can be eliminated, and even after installation, the opening direction of the jack can be freely changed. Thus when it is desired to change the direction of insertion of the plug, there is no need for specific work to be done by engineers.

While the invention has been described with reference to a preferred embodiment thereof, it is to be understood that modifications or variations may be easily made without departing from the scope of the present invention which is defined by the appended claims.

What is claimed is:

1. A connecting block for electrically connecting a plug of a telephone set to a telephone line, comprising:
 a base plate having a terminal for connection to the telephone line;
 a jack unit including a jack having an opening for inserting the plug thereinto, said jack unit having parallel side walls across said jack opening;
 a pair of parallel retaining members extending upwardly from side edges of said base plate for removably retaining said jack unit therebetween; and
 a cover for enclosing said retaining members, said jack unit and said terminal, said cover having a window to which said jack opening may be exposed;
 the arrangement of said jack unit and said retaining members being such that said jack opening may selectively extend parallel to said base plate or perpendicular thereto.

2. The connecting block as defined in claim 1 wherein said jack unit includes a pair of right-angulated guide members formed on each of said side walls, each of said guide members having a first portion extending perpendicular to said jack opening and a second portion extending parallel to said jack opening, and wherein each of said retaining members has a slit formed in the upper surface thereof for receiving said guide member, so that when said first portions of said guide members are inserted in said slits of said retaining members, said jack opening extends parallel to said base plate and when said second portions of said guide members are inserted in said slits of said retaining members, said jack opening extends perpendicular to said base plate.

3. The connecting block as defined in claim 1 wherein said jack unit includes a pin which, when the plug is inserted in said jack, is inserted from a side surface of said jack unit across said jack opening so as to prevent the plug from slipping off.

* * * * *